(12) United States Patent
Yamaguchi et al.

(10) Patent No.: US 6,837,540 B2
(45) Date of Patent: Jan. 4, 2005

(54) ANTI-SUBMARINE VEHICLE OCCUPANT RESTRAINT SYSTEM

(75) Inventors: Hiroyoshi Yamaguchi, Yokohama (JP); Eiji Shimizu, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 09/976,324

(22) Filed: Oct. 12, 2001

(65) Prior Publication Data

US 2002/0053792 A1 May 9, 2002

(30) Foreign Application Priority Data

Oct. 13, 2000 (JP) .......................................... 2000-314327

(51) Int. Cl.$^7$ .......................... A47C 3/025; A47C 1/02; B60N 2/42

(52) U.S. Cl. ............................. 297/216.1; 297/284.11; 297/330

(58) Field of Search ......................... 297/216.1, 284.11, 297/330

(56) References Cited

U.S. PATENT DOCUMENTS

| | | | | |
|---|---|---|---|---|
| 2,970,862 A | * | 2/1961 | Racine | 296/68.1 |
| 3,591,232 A | | 7/1971 | Simon | 397/216 |
| 3,858,930 A | | 1/1975 | Calandra et al. | 296/65 |

(List continued on next page.)

FOREIGN PATENT DOCUMENTS

| | | |
|---|---|---|
| DE | 3841688 | 6/1990 |
| DE | 4423957 | 1/1996 |
| DE | 19707998 | 9/1998 |
| EP | 0306299 | 3/1989 |
| EP | 0455859 | 11/1991 |
| EP | 0965479 | 12/1999 |
| GB | 2330334 | 4/1999 |
| GB | 2337726 | 12/1999 |
| GB | 2342076 | 4/2000 |
| JP | 58-53525 | 3/1983 |
| JP | 1-275230 | 11/1989 |
| JP | 2-149328 | 12/1990 |
| JP | 3-61440 | 6/1991 |
| JP | 3-227745 | 10/1991 |
| JP | 3-121947 | 12/1991 |
| JP | 4-93222 | 8/1992 |
| JP | 5-229378 | 9/1993 |
| JP | 07081466 | 3/1995 |
| JP | 7-309205 | 11/1995 |
| JP | 10-181527 | 7/1998 |
| JP | 10-181529 | 7/1998 |
| JP | 2000-272446 | 6/2000 |
| JP | 2000-264114 | 9/2000 |
| JP | 2001-180409 | 7/2001 |

Primary Examiner—Peter M. Cuomo
Assistant Examiner—Sarah C. Burnham
(74) Attorney, Agent, or Firm—MacPherson Kwok Chen & Heid LLP; David S. Park

(57) ABSTRACT

In a vehicle occupant restraint system provided in association with a vehicle seat for preventing a vehicle occupant from slipping forward under a seat belt in an impact situation such as a vehicle crash, a pair of support members are provided on either side of the seat frame, and pivotally support a pair of arms across which a cross member extends. The cross member comprises an energy absorbing structure adapted to undergo a controlled deformation under a load occurring as the front part of the seat bottom is raised. The energy absorbing structure may consist of a relatively deformable member wrapped around the cross member or a feature for controlling a mode of deformation of the cross member. When the cross member consists of a pipe member, the energy absorbing structure may comprise a relatively deformable member filled inside the pipe member or perforations formed in the pipe member.

7 Claims, 10 Drawing Sheets

U.S. PATENT DOCUMENTS

| | | | |
|---|---|---|---|
| 3,917,031 A | 11/1975 | Doin et al. | 188/1 C |
| 3,972,561 A | 8/1976 | Breitschwerdt | 297/216 |
| 4,225,184 A | 9/1980 | Strowick | 297/468 |
| 4,589,696 A | 5/1986 | Kanai et al. | 297/284 |
| 4,623,192 A | 11/1986 | Koide et al. | 297/216 |
| 4,652,049 A | 3/1987 | Maruyama et al. | 297/284 |
| 4,705,296 A | 11/1987 | Anderson et al. | 280/806 |
| 4,767,155 A | 8/1988 | Kousaka et al. | 297/219 |
| 4,989,705 A | 2/1991 | Kashio et al. | 192/45 |
| 5,022,707 A * | 6/1991 | Beauvais et al. | 297/216.2 |
| 5,125,472 A | 6/1992 | Hara | 180/271 |
| 5,152,552 A | 10/1992 | Ikegaya | 280/806 |
| 5,186,494 A | 2/1993 | Shimose | 280/806 |
| 5,282,672 A | 2/1994 | Borlinghaus | 297/468 |
| 5,288,105 A | 2/1994 | Ikegaya et al. | 280/806 |
| 5,340,185 A | 8/1994 | Vollmer | 296/68.1 |
| 5,374,105 A | 12/1994 | Kracht et al. | 297/216.1 |
| 5,403,037 A | 4/1995 | Föhl | 280/806 |
| 5,405,180 A | 4/1995 | Föhl | 297/478 |
| 5,449,214 A | 9/1995 | Totani | 296/68.1 |
| 5,451,094 A | 9/1995 | Templin et al. | 297/216.17 |
| 5,485,970 A | 1/1996 | Steffens, Jr. | 242/374 |
| 5,490,706 A | 2/1996 | Totani | 296/68.1 |
| 5,556,159 A | 9/1996 | Canteleux | 297/216.1 |
| 5,556,160 A | 9/1996 | Mikami | 297/216.1 |
| 5,647,628 A | 7/1997 | Pires et al. | 296/68.1 |
| 5,647,635 A | 7/1997 | Aumond et al. | 297/284.11 |
| 5,695,031 A | 12/1997 | Kurita et al. | 192/45 |
| 5,695,242 A | 12/1997 | Brantman et al. | 297/216.1 |
| 5,908,219 A | 6/1999 | Böhmler | 297/216.1 |
| 5,941,355 A | 8/1999 | Iga | 192/45 |
| 5,984,357 A | 11/1999 | Yasuda et al. | 280/806 |
| 6,048,034 A * | 4/2000 | Aumont et al. | 297/478 |
| 6,050,635 A | 4/2000 | Pajon et al. | 297/216.1 |
| 6,113,145 A | 9/2000 | Evans | 280/806 |
| 6,113,185 A | 9/2000 | Yamaguchi et al. | 297/216.1 |
| 6,131,951 A | 10/2000 | Chicken et al. | 280/806 |
| 6,164,700 A | 12/2000 | Masuda et al. | 280/806 |
| 6,254,181 B1 * | 7/2001 | Aufrere et al. | 297/216.1 |
| 6,361,109 B1 * | 3/2002 | Tokarz et al. | 297/344.15 |
| 6,386,631 B1 * | 5/2002 | Masuda et al. | 297/216.1 |
| 6,450,573 B1 * | 9/2002 | Yamaguchi et al. | 297/216.1 |
| 6,460,819 B1 * | 10/2002 | Muhlberger et al. | 248/421 |
| 2001/0022460 A1 * | 9/2001 | Kondo et al. | 297/284.11 |

* cited by examiner

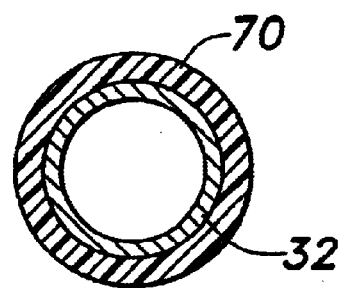
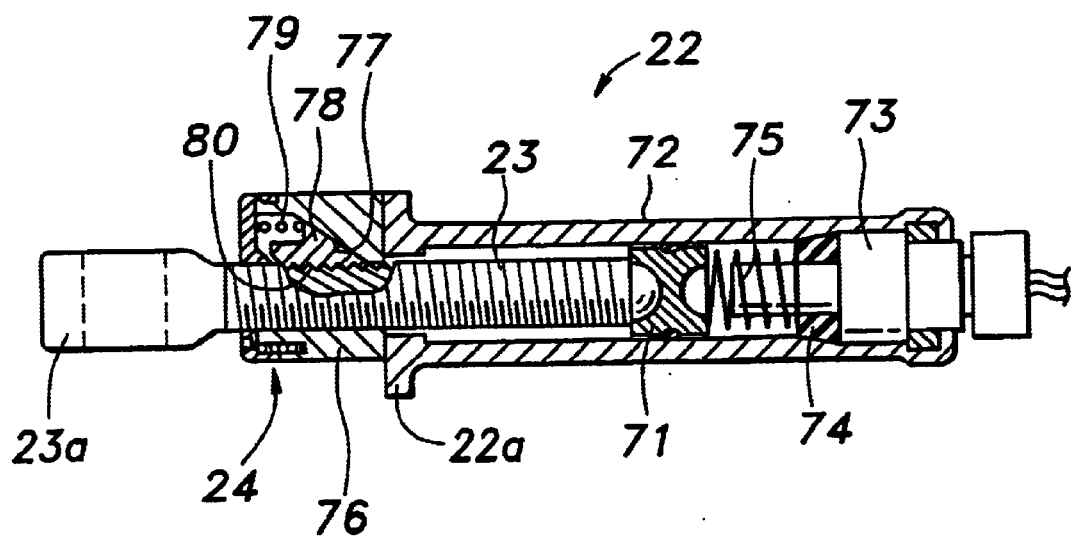

ANTI-SUBMARINE VEHICLE OCCUPANT RESTRAINT SYSTEM

TECHNICAL FIELD

The present invention relates to a vehicle occupant restraint system that is provided in a vehicle seat, and in particular to a vehicle occupant restraint system for preventing the submarining or slipping forward of the vehicle occupant under the seat belt in an impact situation such as a vehicle crash.

BACKGROUND OF THE INVENTION

The term "submarining" means the slipping forward of a vehicle occupant under the seat belt in an impact situation such as a vehicle crash in case the lap belt fails to restrain the pelvis of the vehicle occupant. This occurs most frequently when the vehicle occupant is sitting on an edge of the seat and/or the seat back is significantly reclined, and could impair the restraining capability of the seat belt because the seat belt fails to restrain the proper part of the vehicle occupant.

A copending U.S. patent application Ser. No. 09/526,405 filed Mar. 15, 2000 discloses a vehicle occupant restraint system in which a forward slip preventing member is moveably supported by a pair of casings fixedly attached to either side of a seat frame at a front part of a seat bottom so as to selectively project upward. The front end of the seat is raised only in case of an impact situation such a vehicle crash by actuating this forward slip preventing member with a power unit. The contents of this copending application are hereby incorporated in this application by reference.

The front end of the seat or the cushion member of the seat cushion which is raised by the forward slip preventing member is almost entirely crushed by the load of the vehicle occupant in the impact situation, and the forward slip preventing member practically directly engages the legs of the vehicle occupant. This could cause some discomfort to the vehicle occupant, and a measure to reduce the impact is desired.

For instance, a part or all of the cushion member may be formed with an energy absorbing material made of foamed resin or the like which provides a favorable energy absorbing property, but this not only increases the cost but also impairs the ride quality for the vehicle occupant as compared to the more conventional seat made solely of common cushion material.

BRIEF SUMMARY OF THE INVENTION

In view of such problems of the prior art, a primary object of the present invention is to provide an anti-submarine vehicle occupant restraint system which can reliably prevent the submarining in case of a vehicle crash.

A second object of the present invention is to provide an anti-submarine vehicle occupant restraint system which can reduce the impact on the legs of the vehicle occupant when the forward slip preventing member is deployed.

A third object of the present invention is to provide an anti-submarine vehicle occupant restraint system which is economical and easy to manufacture.

According to the present invention, such objects can be accomplished by providing a vehicle occupant restraint system provided in association with a vehicle seat for preventing a vehicle occupant from slipping forward under a seat belt in an impact situation such as a vehicle crash, comprising; a pair of fixed support members attached to either side of a seat frame at a front part of a seat bottom; an arm pivotally attached to a front end of each of the fixed support members: a cross member extending between free ends of the arms; and a power unit provided in association with at least one of the support members for actuating the arms and cross member upward so as to selectively raise a front part of the seat bottom in an impact situation such as a vehicle crash; the cross member comprising an energy absorbing structure adapted to undergo a controlled deformation under a load occurring as the front part of the seat bottom is raised.

The energy absorbing structure allows the maximum load that is applied to the legs of the vehicle occupant to be controlled while restraining the vehicle occupant in an effective manner in case of a vehicle crash. By controlling the maximum load that is applied to the legs of the vehicle occupant, the injury to the vehicle occupant can be minimized The energy absorbing structure may comprise a relatively deformable member placed over the cross member. For instance, a urethane foam sleeve having a controlled deformation property may be wrapped around the cross member.

The cross member typically consists of a pipe member. In this case, the energy absorbing structure may comprise perforations formed in the pipe member or a relatively deformable member filled inside the pipe member. The pipe member may consist of a normal pipe having a circular cross section, or may be flattened in the part intended to engage the legs of the vehicle occupant. The pipe member may also be formed by stamp forming a single piece plate member or two piece plate members.

The maximum load that is applied to the legs of the vehicle occupant can be controlled by adapting the cross member to undergo a deformation in a predictable manner. This can be achieved, for instance, by providing locally deformable parts such as slits, notches, holes, recesses and thin-walled parts in appropriate parts of the cross member or locally reinforced parts such as ribs and thick-walled parts.

BRIEF DESCRIPTION OF THE DRAWINGS

Now the present invention is described in the following with reference to the appended drawings, in which.

FIG. 8 is a cross sectional view of the cross member or the slip preventing member;

FIG. 9 is a sectional view of the power unit including a cylinder unit and a piston rod;

DETAILED DESCRIPTION OF THE PREFERRED EMBODIMENTS

Figure 1:
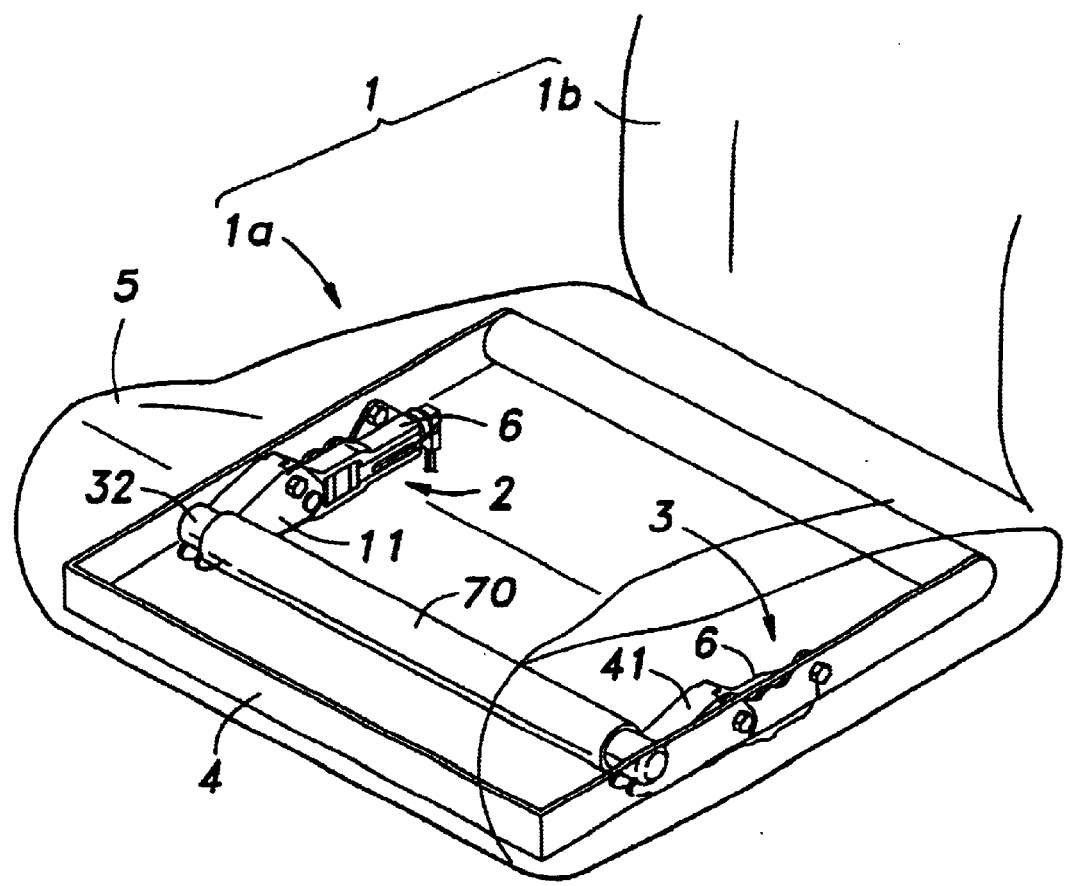
FIG. 1 is a transparent perspective view of a vehicle seat embodying the present invention.

FIG. 1 is a perspective view of a vehicle seat 1 embodying the present invention. The vehicle seat 1 comprises a seat bottom 1a and a seat back 1b which is typically adapted to be reclined to a desired angle by an adjustable pivot mechanism not shown in the drawing. The seat bottom 1a comprises a seat frame 4 which in this case consists of a rectangular frame having a pair of longitudinal side members and a pair of cross members joining the front and rear ends of the side members with each other, and a cushion member 5 which covers the seat frame 4. The cushion member 5 may be simply made of foamed plastic material or consist of any known composite structure. A pair of subassemblies 2 and 3 forming a vehicle occupant restraint system according to the present invention are attached to the inner sides of the side members of the seat frame 4. The seat frame 4 may be supported by a seat rail assembly fixedly attached to the vehicle body via sliders in a slidable manner, and adapted to be fixed at a desired position with a seat adjust mechanism not shown in the drawing.

Figure 2:
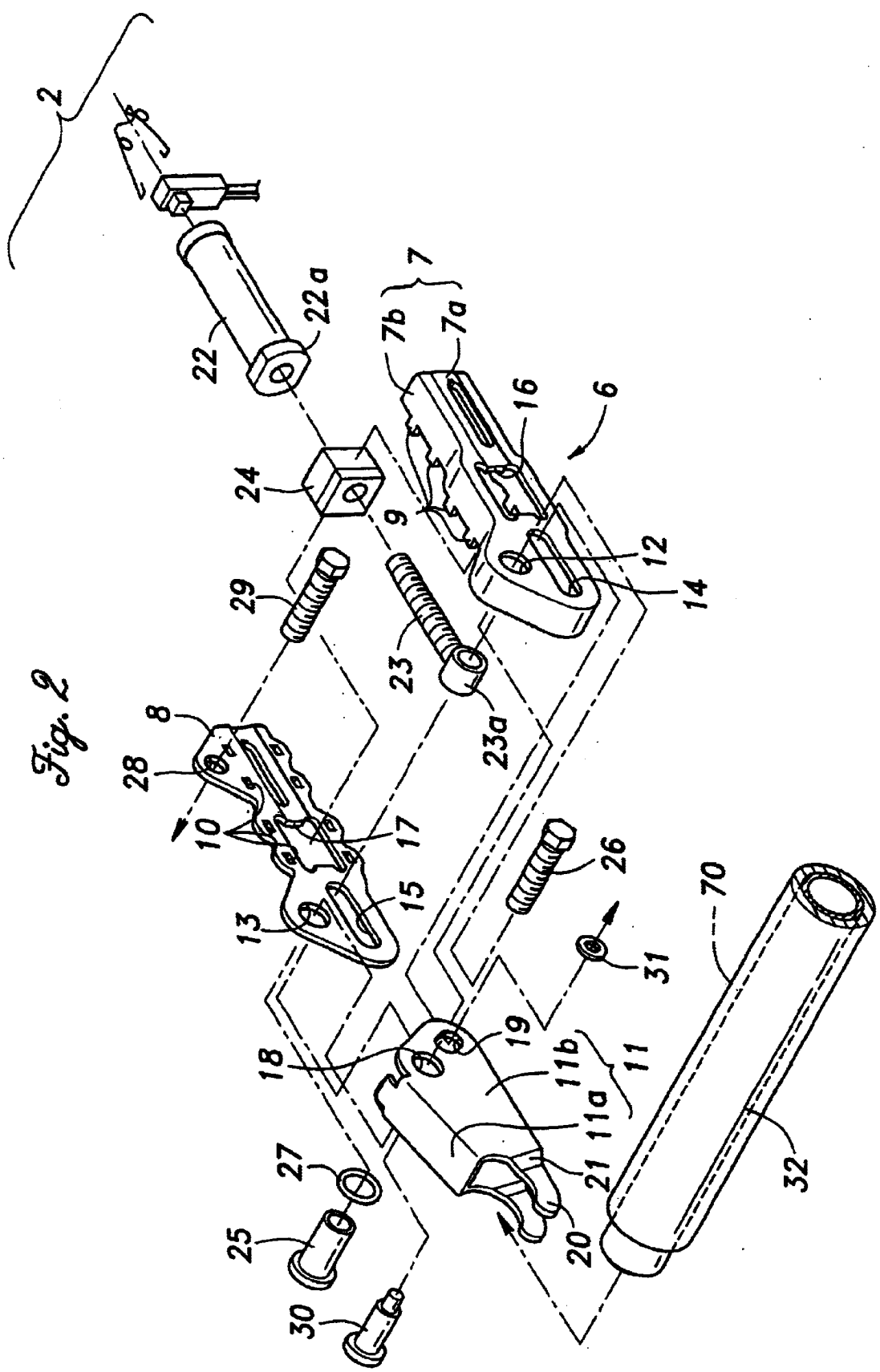
FIG. 2 is an exploded perspective view of the subassembly provided on the right had side of the seat frame.
Figure 3:
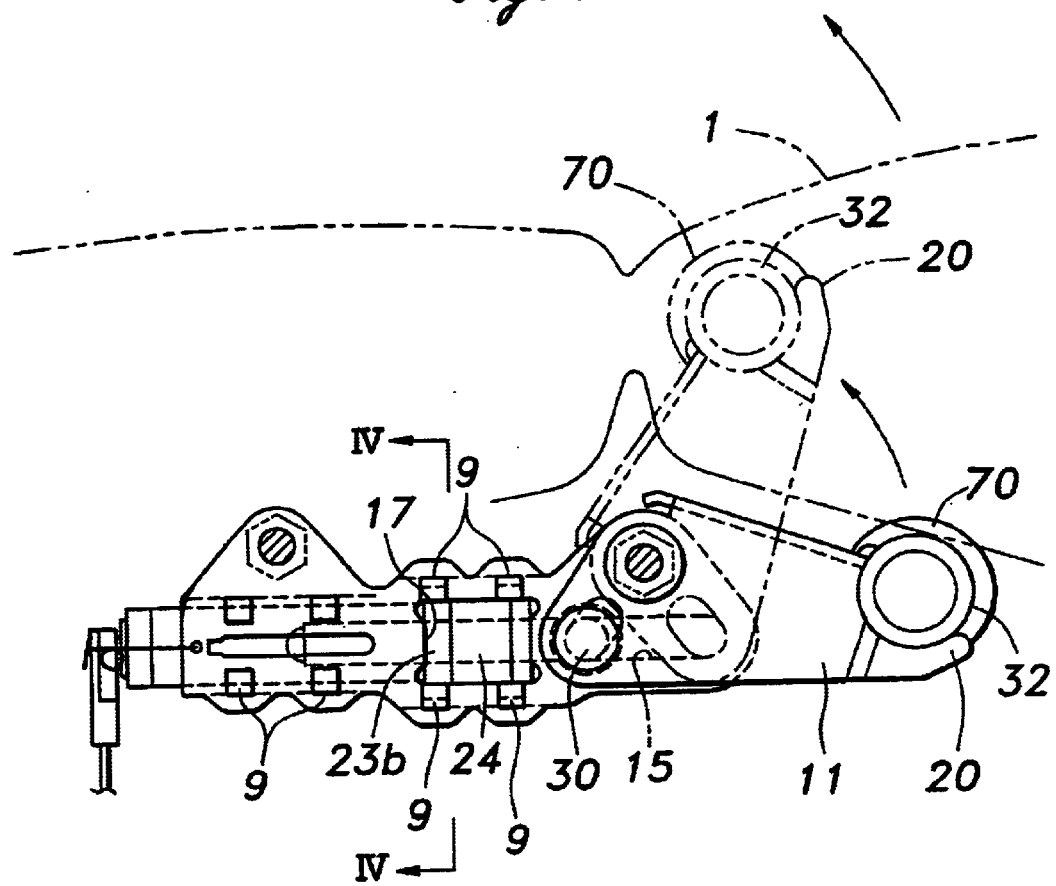
FIG. 3 is a side view of the subassembly on the right as seen from the right side.
Figure 4:
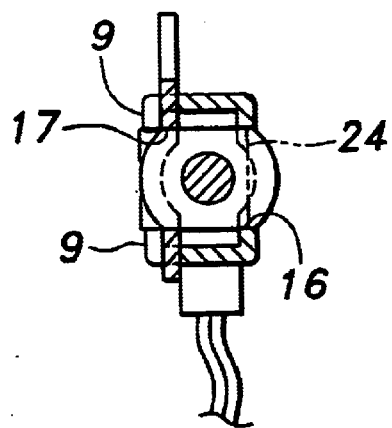
FIG. 4 is a cross sectional view taken along line IV—IV of FIG. 3.

FIGS. 2 to 4 show the structure of the subassembly 2 on the right hand side of the vehicle occupant restraint system. The subassembly 2 comprises a tubular casing 6 having a rectangular cross section and elongated in the fore-and-aft direction of the vehicle body. The casing 6 is comprised of a main member 7 and a lid member 8 both of which are formed by stamp forming sheet metal. The main member 7 comprises a vertically extending section 7a and a pair or flanges 7b extending from upper and lower ends of the vertically extending section 7a toward the lid member 8. In this embodiment, the upper and lower flanges 7a are smoothly connected to each other at the front end of the casing 6. Free ends of the upper and lower flanges 7b are provided with projecting tabs 9 which are fitted into corresponding openings 10 provided in the lid member 8, and crimped on the lid member 8.

An arm 11 is pivotally attached to the front end of the casing 6. The arm 11 comprises a laterally extending web 11a and a pair of arm flanges 11b depending from either side of the web 11a. The upper front parts of the main member 7 and lid member 8 are provided with mutually aligned openings 12 and 13, and a corresponding opening 19 is passed through the arm flanges 11b. A collar 25 is passed through these openings 12, 13 and 19 to pivotally support the arm 11 with respect to the casing 6.

A power unit comprising a cylinder unit 22 extending in a fore-and-aft direction and a piston rod 23 extending from a front end of the cylinder unit 22 is received in the casing 6. The front end of the piston rod 23 is provided with a ring 23a. The outer circumferential surface of the piston rod 23 is provided with annular or spiral grooves. The lower front parts of the main member 7 and lid member 8 are provided with slots 14 and 15 elongated in the fore-and-aft direction, and a corresponding oblique slot 18 which is only slightly elongated and offset from the opening 19 is passed through the arm flanges 11b. A pin 30 is passed through these slots 14, 18 and 15 and the ring 23a, and is retained therein by a retaining ring 31.

As best shown in FIG. 4, the vertically extending section 7a of the main member 7 and lid member 8 are profiled so as to conform to or wrap around the cylindrical contour of the cylinder unit 22. Rectangular openings 16 and 17 are formed in intermediate parts of the main member 7 and lid member 8, and jointly retain therein a radial flange 22a formed in the front end of the cylinder unit 22 as well as a lock mechanism 24 provided on the front end of the radial flange 22a. Thus, the front facing edges of the rectangular openings 16 and 17 are adapted to support the reaction of the cylinder unit 22 at the time of its activation via the back surface of the radial flange 22a. These edges are also contoured around the cylinder unit 22 as a result of the fact that the vertically extending section 7a of the main member 7 and lid member 8 are contoured around the cylinder unit 22, and are therefore allowed to abut the back surface of the radial flange 22a over a relatively large support surface. These rectangular openings 16 and 17 are each closed on all sides so that a high mechanical strength can be achieved with respect to the impact which is generated at the time of the activation of the vehicle occupant restraint system.

This subassembly 2 is attached to the side member of the seat frame 4 by passing a pair of threaded bolts 26 and 29 through the collar 25 pivotally supporting the arm 11 and a hole 28 formed in a tab-like extension of the lid member 8 at an upper rear end thereof from inside the seat frame 4 and fastening nuts from the, outside of the seat frame 4. The collar 25 is provided with an adequate length to support the axial force of the threaded bolt 26 without preventing the pivoting movement of the arm 11. Therefore, there is a play that permits a slight lateral movement of the arm 11 along the collar 25, and a rubber ring 27 interposed between a head of the collar 25 and a side of the arm 11 prevents any rattling of the arm 11 during use.

Figure 5:
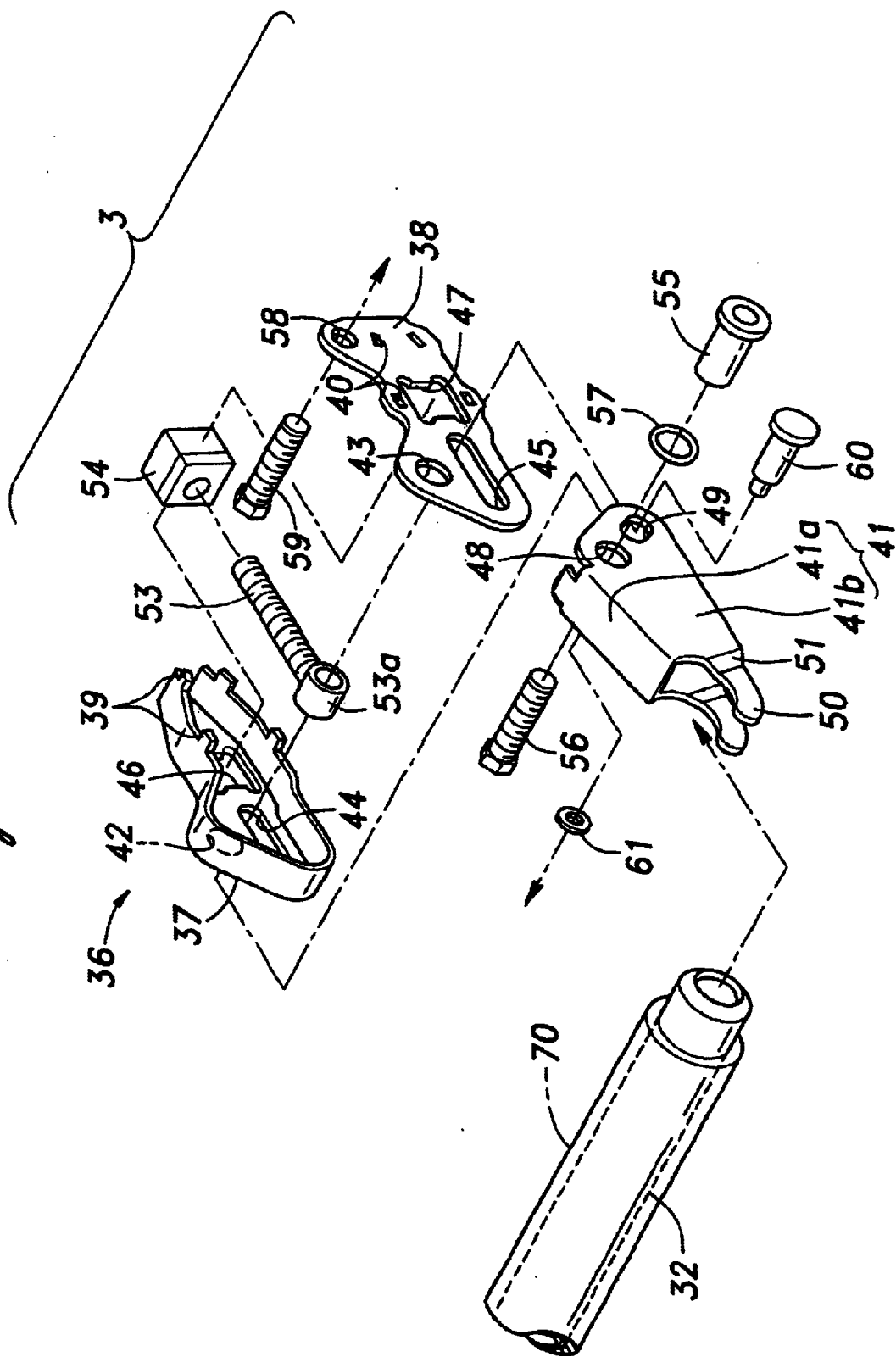
FIG. 5 is a perspective view of the subassembly provided on the left hand side of the seat frame.
Figure 6:
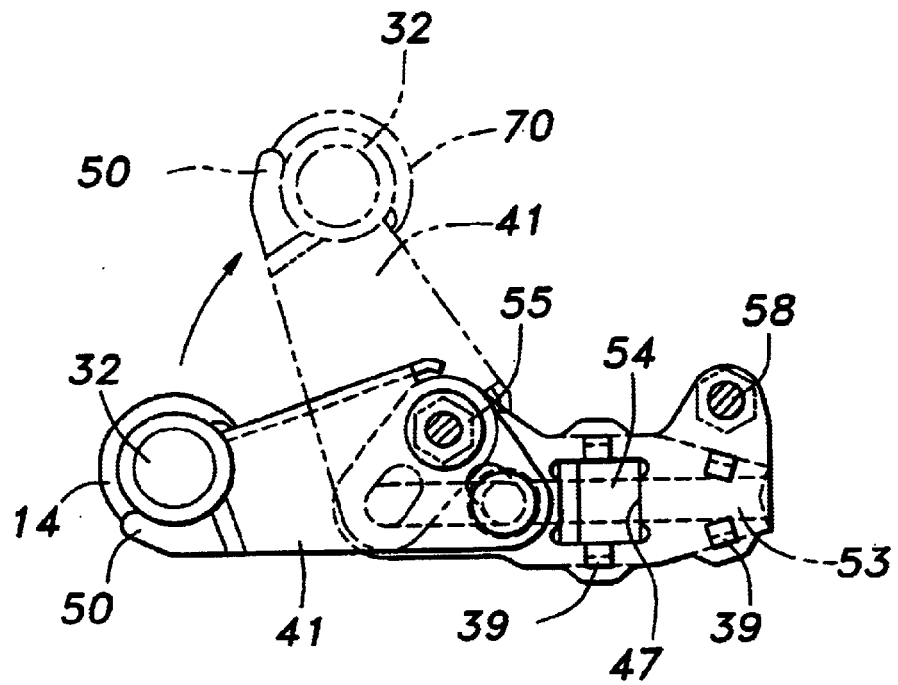
FIG. 6 is a side view of the subassembly on the left as seen from the left side.

FIGS. 5 and 6 show the structure of the subassembly 3 on the left hand side of the vehicle occupant restraint system. The subassembly 3 comprises a tubular casing 36 having a rectangular cross section and elongated in the fore-and-aft direction of the vehicle body. The casing 36 is comprised of a main member 37 and a lid member 38 both of which are formed by stamp forming sheet metal. The main member 37 comprises a vertically extending section 37a and a pair of flanges 37b extending from upper and lower ends of the vertically extending section 37a toward the lid member 38. Free ends of the upper and lower flanges 37b are provided with projecting tabs 39 which are fitted into corresponding openings 40 provided in the lid member 38, and crimped on the lid member 38.

An arm 41 is pivotally attached to the front end of the casing 36. The arm 41 comprises a laterally extending web 41a and a pair of arm flanges 41b depending from either side of the web 41a. The upper front parts of the main member 37 and lid member 38 are provided with mutually aligned openings 42 and 43, and a corresponding opening 49 is passed through the arm flanges 41b. A collar 55 is passed through these openings 42, 43 and 49 to pivotally support the arm 41 with respect to the casing 36.

A rod 53 extending in a fore-and-aft direction is received in the casing 36. The front end of the rod 53 is provided with a ring 53a. The outer circumferential surface of the rod 53 is provided with annular or spiral grooves. The lower front parts of the main member 37 and lid member 38 are provided with slots 44 and 45 elongated in the fore-and-aft direction, and a corresponding oblique slot 48 which is only slightly elongated and offset from the opening 49 is passed through the arm flanges 41b. A pin 60 is passed through these slots 44, 48 and 45 and the ring 53a, and is retained therein by a retaining ring 61.

Rectangular openings 46 and 47 are formed in intermediate parts of the main member 37 and lid member 38, and jointly retain therein a lock mechanism 54 and the rod 53 is passed through this lock mechanism 54.

This subassembly 3 is attached to the side member of the seat frame 4 by passing a pair of threaded bolts 56 and 59 through the collar 55 pivotally supporting the arm 41 and a hole 58 formed in a tab-like extension of the lid member 38 at an upper rear end thereof from inside the seat frame 4 and fastening nuts from the outside of the seat frame 4. The collar 55 is provided with an adequate length to support the axial force of the threaded bolt 56 without preventing the pivoting movement of the arm 41. Therefore, there is a play that permits a slight lateral movement of the arm along the collar, and a rubber ring 57 interposed between a head of the collar 55 and a side of the arm 41 prevents any rattling of the arm 41 during use.

A cross member consisting of a pipe member 32 and serving as a forward slip preventing member extends across the free end 20 of the arm 11 of the subassembly 2 and the free end 50 of the arm 41 of the subassembly 3, and is welded to them. When welding each end of the pipe member 32 to the corresponding arm 11 or 41, it is necessary to take a measure to ensure an adequate welding area. It is also necessary to minimize the weight and size of the related parts. As opposed to fitting each end of the pipe member 32 into a hole provided in the corresponding arm 11 or 41, the free ends 20 and 50 of the arms 11 and 41 support only the lower side of the pipe member 32. This provides an adequate welding area while minimizing the weight and size of the related parts.

Figure 7:
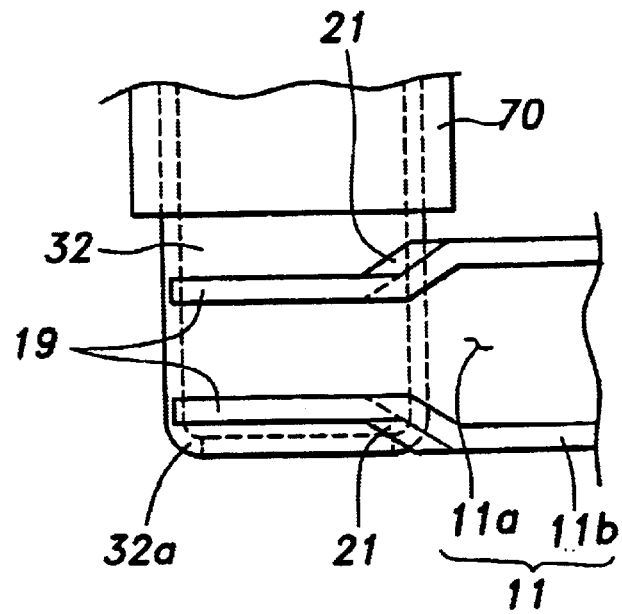
FIG. 7 is a fragmentary bottom view of the cross member and one of the arms.

Because the pipe member 32 must not extend beyond the side profile of the subassembly 2 or 3, the free end 20 or 50 of each arm 11 or 41 consisting of the arm flanges are made narrower in width by bending the flanges 11b and 41b inwardly about vertical folding lines as indicated by numeral 21 and 51. This allows the pipe member 32 to extend outwardly beyond the outer profile of the free end 20 or 50 of the arm 11 or 41 without interfering with the seat frame 4 as shown in FIG. 7. Because the pipe member 32 extends slightly beyond the outer profile of the free end of the arm, the welding work can be performed without the fear of melting away the terminal end of the pipe member 32. Also, as shown in FIG. 7, each end part 32a of the pipe member 32 is swaged or crimped radially inward. This allows an adequate amount of material to be provided for welding, and contributes to the prevention of the pipe member 32 from melting away at the time of welding.

As shown in FIGS. 2, 5, 7 and 8, an energy absorbing member 70 is wrapped around the pipe member 32. This energy absorbing member 70 may be made of any material that can reduce the impact that is transmitted from the pipe member 32 to the vehicle occupant such as a tubular member made of foamed resin such as hard urethane. If a plurality of layers of different energy absorbing members 70 having different energy absorbing properties are used, a desired composite energy absorbing property may be achieved. The energy absorbing member 70 may be insert molded around the pipe member 32 or attached to the pipe member 32 afterwards.

Referring to FIG. 9, the cylinder unit 22 comprises a cylindrical cylinder member 72, a piston member 71 slidably received in the cylinder member 72 and a propellant module 73 received in an end of the cylinder member 72 remote from the flange 22a. The propellant module 73 is provided with a small diameter portion facing the piston member 71, and an annular seal member 74 is fitted on the small diameter portion so as to abut an annular shoulder defined at the base of the small diameter portion and the inner circumferential surface of the cylinder member 72 to seal off the gas that is produced from the small diameter portion when the propellant module 73 is activated. The end of the cylinder member 72 adjacent to the rear end of the propellant module 73 is crimped on the propellant module 73, and the annular seal 74 resiliently supports, the propellant module 73 against the force of crimping. A compression coil spring 75 is interposed between the piston member 71 and the annular seal 74. The inner end of the piston rod 23 is provided with a spherical shape, and is received in a complementary spherical recess formed in the piston member 71.

The lock mechanism 24 is provided with a casing 76 which internally defines a sloping surface 77. An engagement piece 78 is resiliently urged against this sloping surface 77 by a compression coil spring 79, and the slopping surface 77 is oriented in such a manner that the engagement piece 78 is resiliently urged also against the outer surface of the piston rod 23 under the spring force of the compression coil spring 79. The engagement piece 78 is provided with teeth 80 which mesh with the grooved surface of the piston rod 23. Because of the orientation of the sloping surface 77, the engagement piece 78 would not prevent the outward movement of the piston rod 23 by being pushed away from the sloping surface 77 against the spring force of the compression coil spring 79, but prevents the inward movement of the piston rod 23 by wedging in between the sloping surface 77 and the outer circumferential surface of the piston rod 23.

Only one engagement piece 78 was used in the above described embodiment to engage a part of the outer circumferential surface of the piston rod 23, but a plurality of engagement pieces may be used for engaging the outer circumferential surface of the piston rod 23 from a plurality of directions. The other lock mechanism 54 may be similar to the lock mechanism 24.

The vehicle occupant restraint system is thus formed by the right and left subassemblies 2 and 3, and the pipe member 32. An impact detecting sensor consisting of an acceleration sensor or the like not shown in the drawing, and a control unit may be provided for activating the restraint system when appropriate.

The mode of operation of this embodiment is described in the following. When an impact of a vehicle crash is detected, gas is produced in the cylinder unit 22, and the resulting rapid rise in the internal pressure inside the cylinder member 72 produces a thrust which pushes the piston member 71 out of the cylinder member 72 causing the free end of the piston rod 23 to project rapidly. As a result, the arm 11 connected to the free end of the piston rod 23 rotates in counterclockwise direction as indicated by the imaginary lines in FIG. 3, and the pipe member 32 moves upward causing the seat cushion member 5 to bulge out and prevent the submarining of the vehicle occupant. The annular shoulder formed in the inner circumferential surface of the cylinder member 72 at the flanged end of the cylinder unit 22 prevents the piston member 71 from being thrown forward out of the cylinder unit 22. When the gas has ceased to be produced from the propellant module 73, and the drive force of the cylinder unit 22 has been lost, the one-way lock mechanisms 24 and 54 prevent the pipe member 32 from coming down, and continues to prevent the submarining. The energy absorbing member 70 provides a required cushioning action.

The cylinder unit 22 was provided only on the right hand side of the seat, but may also be provided on each side of the seat. If two cylinder units are used, each of them can be made smaller. Although not shown in the drawings, the one-way lock mechanism may also consist of a ball type one-way lock mechanism which can prevent the reverse rotation in a continuous manner, a ratchet mechanism or the like.

The energy absorbing member 70 was wrapped around the pipe member 32 serving as the forward slip preventing member as the energy absorbing structure in the illustrated embodiment, but the same goal can be achieved by giving a desired energy absorbing property to the pipe member by changing the material, wall thickness, diameter and cross sectional shape of the pipe member.

Figure 10:
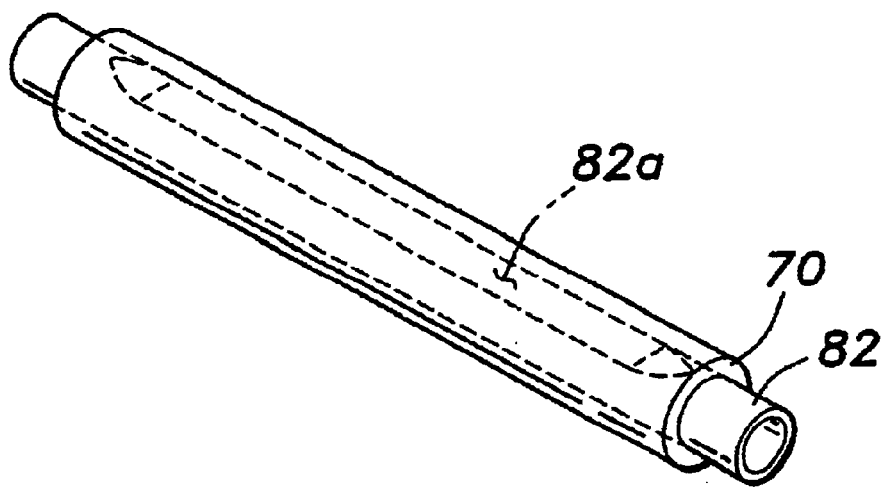
FIGS. 10 to 15 are perspective views showing different embodiments of the slip preventing member.
Figure 11:
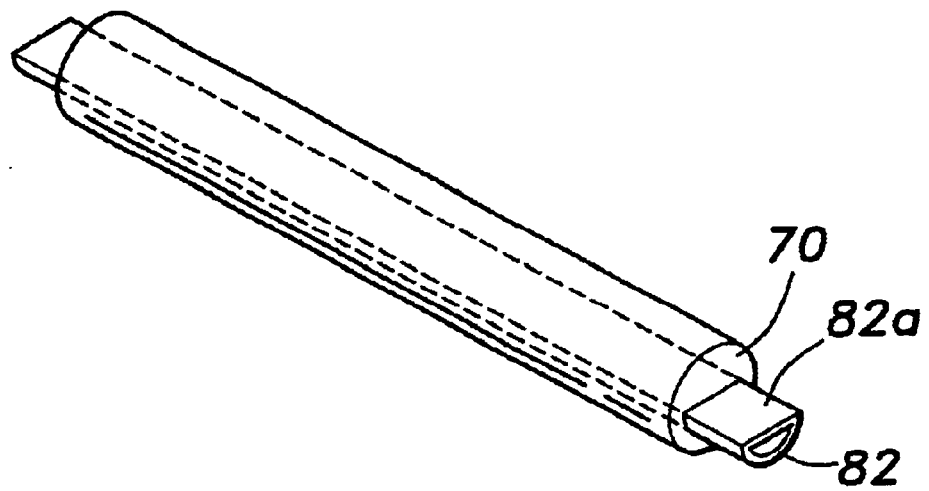

FIGS. 10 and 11 show embodiments in which the forward slip preventing member comprises a pipe member 82 having a part thereof opposing the legs of the vehicle occupant flattened so as to define an engagement surface consisting of a flattened portion 82a for making a surface contact with the legs of the vehicle occupant and thereby reducing the surface pressure, as opposed to the normal pipe member 32, and an energy absorbing member 70 wrapped around the member 32. The embodiment illustrated in FIG. 10 uses a pipe member 82 having the flattened portion 82a only in the central part thereof, and the embodiment illustrated in FIG. 11 uses a pipe member 32 having the flattened portion 32a extending over the entire length thereof.

Figure 12:
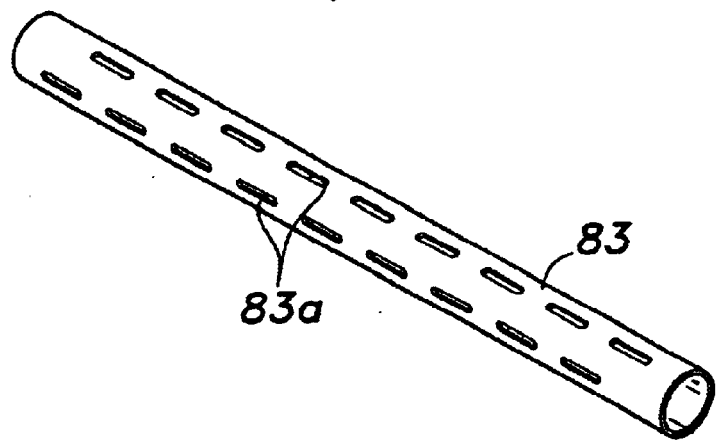
Figure 13:
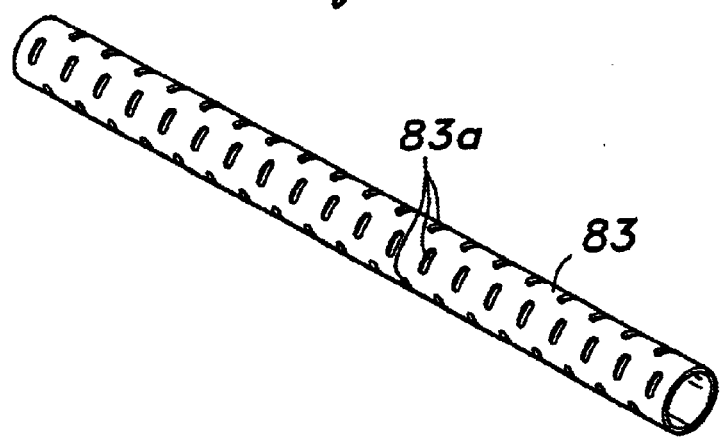
Figure 14:
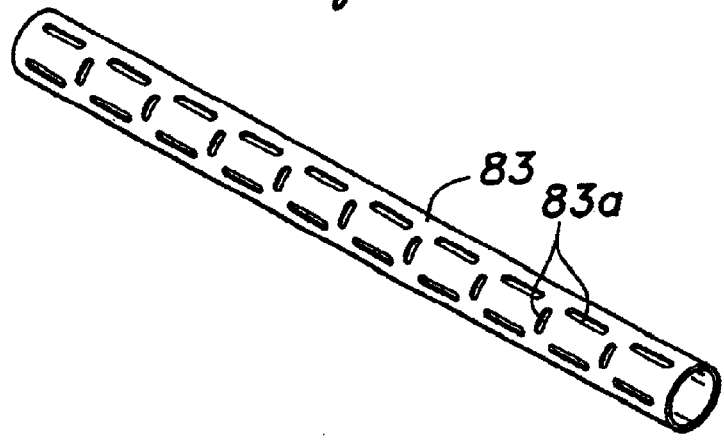

FIGS. 12 to 14 show embodiment using a pipe member 83 serving as the forward slip preventing member formed with a plurality of holes 83a to control the deformation property thereof, instead of the normal pipe member 32. These holes 83a may be punched in a plate member which is then formed into a pipe. FIG. 12 shows an embodiment in which the holes 83a consist of slots elongated in the axial direction, FIG. 13 shows an embodiment in which the holes 83a consist of circumferentially elongated slots, and FIG. 14 shows an embodiment in which the holes 83a consist of a combination of axially elongated slots and circumferentially elongated slots. A desired deformation property can be achieved by suitably changing the size, number, shape and pitch of these holes 83a.

Figure 15:
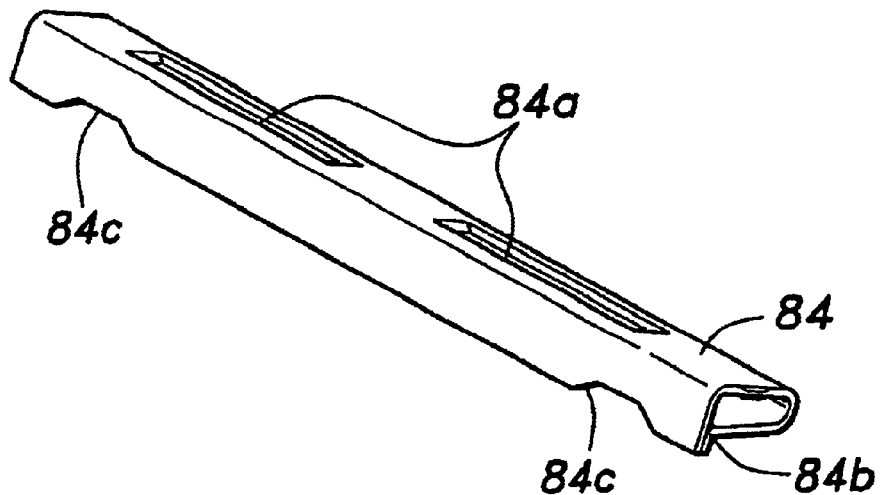
Figure 16:
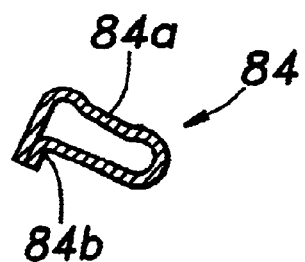
FIG. 16 is a cross sectional view of the slip preventing member illustrated in FIG. 15.

FIGS. 15 and 16 show and embodiment in which a plate member is stamp formed into a pipe 84 having a rectangular or elliptic cross section so as to present a flattened engagement surface 84a opposing the legs of the vehicle occupant and reduce the surface pressure by achieving a surface contact with the legs of the vehicle occupant. The two edges of the plate member may extend one next to the other in the manner of a depending flange 84b, and spot welded together to retain the tubular shape of the pipe member 84. This pipe member 84 is provided with a pair of ribs 84a extending in the axial direction on either side of the center of the pipe member 84, and a pair of notches 84c are provided in the depending flange 84b adjacent to the terminal ends thereof. The ribs 84a locally increase the resistance to the bending deformation of the pipe member 84 while the notches 84c locally decrease the resistance to the bending deformation. Therefore, this pipe member 84 is adapted to undergo a controlled and predictable deformation when subjected to a loading at the time of its deployment.

Figure 17:
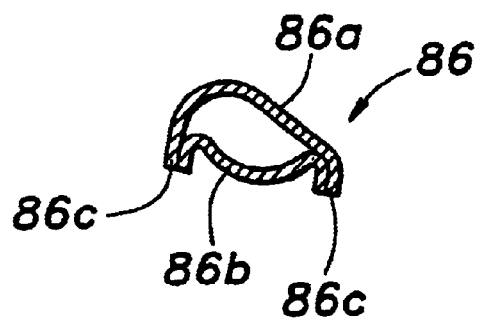
FIG. 17 is a cross sectional view showing yet another embodiment of the slip preventing member.

FIG. 17 is a modified embodiment of the pipe member 86 which is made of a pair of plate members 86a and 86b which are joined at a pair of depending flanges 86c. The pipe member 86 is provided with an elliptic cross section and the two plate members 86a and 86b arm joined along the flanges 86c by spot welding.

Figure 18:
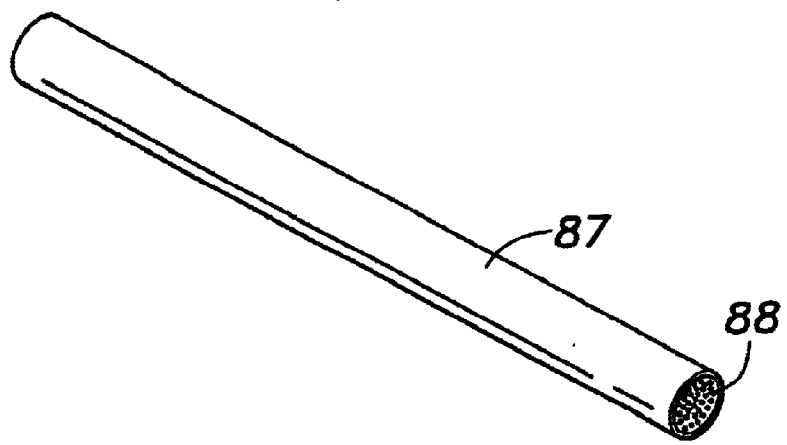
FIGS 18 to 20 are perspective views showing different embodiments of the slip preventing member.

FIG. 18 shows an embodiment of the forward slip preventing member made of a pipe member 87 having a relatively thin wall, as opposed to the normal pipe member 32, which is filled with an energy absorbing material 88. The energy absorbing member 88 may be inserted in the pipe member 87 or foamed inside the pipe member 87. A structural member made of a thin plate member and having a closed cross section typically collapses locally, and is therefore unable to provide a desired load property. However, when it is filled with an energy absorbing member 88, it can be avoided, and a desired energy absorbing property as well as a desired deformation property can be achieved.

Figure 19:
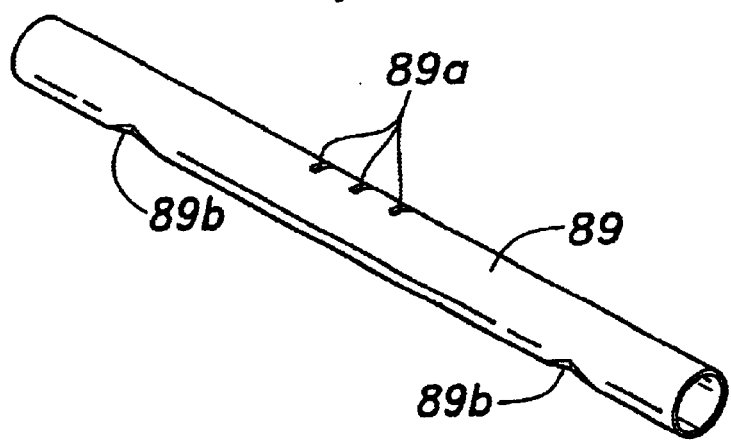
Figure 20:
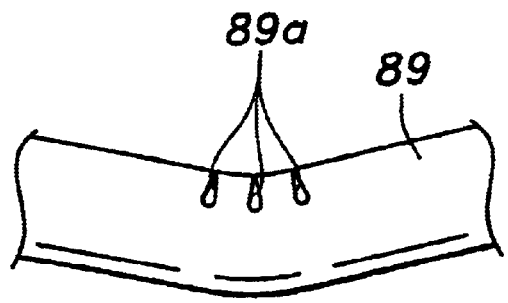

In the embodiment illustrated in FIG. 19, the deformation property is controlled by forming a plurality of circumferential slits 89a in the pipe member 89 on the side facing the legs of the vehicle occupant, instead of a normal pipe member 32. A pair of recesses 89b are formed on the underside of the pipe member 89 adjacent to either terminal end thereof. According to this structure, when a load is applied from the side of the vehicle occupant, the pipe member 89 slightly deforms under a relatively small load until the slits 89a are closed, but once the slits 89a are closed (FIG. 20), the pipe member 89 becomes more resistant to deformation and is enabled to withstand a higher load. The recesses 89b on the underside of the pipe member 89 helps the pipe member 89 to bend in a highly controlled and predicable manner.

In the foregoing embodiments, the energy absorbing structure was used either by itself or in combination with the engagement surface arrangement adapted to make a surface contact with the legs or the vehicle occupant, but it is also possible to use the engagement surface arrangement adapted to make a surface contact with the legs of the vehicle occupant by itself, or in combination with any other arrangements.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle occupant restraint system provided in association with a vehicle seat for preventing a vehicle occupant from slipping forward under a seat belt in an impact situation such as a vehicle crash, comprising:

a pair of fixed support members attached to either side of a seat frame at a front part of a seat bottom;

an arm pivotally attached to a front end of each of said fixed support members;

a cross member extending between free ends of said arms; and a power unit provided in association with at least one of said support members for actuating said arms and cross member upward so as to selectively raise a front part of said seat bottom in an impact situation such as a vehicle crash;

wherein said cross member comprises a pipe member including a feature for controlling a mode of deformation of said pipe member as said pipe member is actuated upward to restrain the vehicle occupant in an impact situation.

2. A vehicle occupant restraint system according to claim 1, wherein a relatively deformable member is placed over said pipe member.

3. A vehicle occupant restraint system according to claim 1, wherein said feature comprises a slot or hole formed in said pipe member.

4. A vehicle occupant restraint system in according to claim 1, wherein said feature comprises a notch formed in said pipe member.

5. A vehicle occupant restraint system provided in association with a vehicle seat for preventing a vehicle occupant from slipping forward under a seat belt in an impact situation such as a vehicle crash, comprising:

a pair of fixed support members attached to either side of a at frame at a front part of a seat bottom;

an arm pivotally attached to a front end of each of said fixed support members;

a cross member extending between free ends of said arms; and a power unit provided in association with at least one of said support members for actuating said arms and cross member upward so as to selectively raise a front part of said seat bottom in an impact situation such as a vehicle crash;

wherein said cross member comprises a pipe member having a wall flattened from an otherwise cylindrical profile to define a planar surface for engaging the vehicle occupant.

6. A vehicle occupant restraint system according to claim 5, wherein said pipe member is provided with a depending flange extending in parallel with said pipe member.

7. A vehicle occupant restraint system provided in association with a vehicle seat for preventing a vehicle occupant from slipping forward under a seat belt in an impact situation such as a vehicle crash, comprising:

a pair of fixed support members attached to either side o a seat frame at a front part of a seat bottom;

an arm pivotally attached to a front end of each of said fixed support members;

a cross member extending between free ends of said arms; and a power unit provided in association with at least one of said support members for actuating said arms and cross member upward so as to selectively raise a front part of said seat bottom in an impact situation such as a vehicle crash;

wherein said cross member comprises a pipe member adapted to undergo a controlled deformation under a load occurring as said front part of said seat bottom is raised, and further wherein a relatively deformable member is included inside said pipe member.

* * * * *